Aug. 25, 1964 E. C. GREANIAS ETAL 3,146,422

AUTOMATIC OUTPUT CONTROL SYSTEM

Filed July 14, 1958 2 Sheets-Sheet 1

INVENTORS
EVON C. GREANIAS
WILLIAM W. HARDIN

BY Paul M. Brannen

AGENT

Aug. 25, 1964 E. C. GREANIAS ETAL 3,146,422

AUTOMATIC OUTPUT CONTROL SYSTEM

Filed July 14, 1958 2 Sheets-Sheet 2

United States Patent Office 3,146,422

Patented Aug. 25, 1964

3,146,422
AUTOMATIC OUTPUT CONTROL SYSTEM

Evon C. Greanias, Vestal, and William W. Hardin, Endicott, N.Y., assignors to International Business Machines Corporation, New York, N.Y., a corporation of New York Filed July 14, 1958, Ser. No. 748,487
4 Claims. (Cl. 340—146.3)

This invention relates to automatic output control systems and particularly to an improved automatic output control system for use in connection wtih character recognition systems.

A serious problem in character recognition is the provision of suitable means for compensating for variations in density of the characters to be recognized. In the printing of such characters, the ink or other printing material may vary in consistency, and the printing process itself is bound to cause variations in the density of the resulting characters. Thus the signals derived from scanning such printed characters, whether such scanning is performed optically, magnetically, or otherwise, will vary over a relatively large range, which for example can be as great as 30 to 1. It has been previously proposed to provide means which compensates for variations which occur in the relative density of the scanned characters, in which a certain predetermined amplitude of signal must be exceeded during the scanning of a character portion, in order to supply an output to the character analyzing portion of the apparatus. However, a single fixed discriminating level is undesirable in view of the fact that simultaneous variations in the background and the character may result in the loss of required scanning signals or the presence of undesirable signals or noise.

It has further been proposed to provide an automatic adjustment of the gain of the amplifiers associated with the scanning apparatus by means akin to automatic gain control as employed in radio receivers. Such arrangements, though, require a finite time to operate, since they depend on the signal-to-noise ratio existing at a given time to compensate for further variations, usually as a result of integrating the output signal over a short time interval. During this time interval, the actual gain or level is incorrect, so that signals occurring during this time can be lost or noise can be supplied to the output, depending upon the instantaneous gain being insufficient or excessive. In the ordinary radio receiver, this delay is not objectionable because the period is sufficiently short, and the ear does not detect the resulting uncompensated signals or noise. However, in character recognition systems operating at intermediate or high speeds, even a relatively short delay in adjustment of the gain control could result in loss of recognition during the scanning time of one or more characters.

It is accordingly an object of this invention to provide an improved automatic output control system in which the density of the characters to be scanned is measured at a preliminary station preceding the actual scanning station, and the output control is governed accordingly.

Another object of the invention is to provide an improved automatic output control system in which the entire scanning zone of a document is scanned simultaneously at a preliminary scanning station to obtain an output control signal for governing the level of scanning signals at a second scanning station.

A further object of the invention is to provide an improved automatic output control system in which a dynamic output control signal is obtained prior to actual scanning of a document in order that the output control signal be applied concurrently with the scanning of the characters on the document.

A further object of the invention is to provide an improved automatic output control system which is especially applicable to character recognition systems for magnetized or magnetizable characters.

Still another object of the invention is to provide an improved automatic output control system.

Other objects of the invention will be pointed out in the following description and claims and illustrated in the accompanying drawings, which disclose, by way of examples, the principle of the invention and the best mode which has been contemplated of applying that principle.

Briefly described, the present invention comprises means for deriving a time varying potential at a preliminary scanning station, which potential is instantaneously proportional to the relative density of the characters to be recognized. This signal is integrated by suitable integrating means, so that the integrated output signal is a relatively slowly varying signal which is proportional to the relative density of the character, over a predetermined area. This integrated control signal is delayed by means of a suitable delay unit, and is then supplied to the control portion of an output control circuit, such as a variable gain amplifier, which is employed to amplify the scanning voltages produced at the main or principal scanning station. The delay unit is constructed and arranged so that the control signal voltage is supplied to the variable gain amplifier with a delay such that it corresponds to the period of time required for the characters scanned in the auxiliary or advance scanning station to reach the main or principal scanning station, whereby the automatic gain control voltage is supplied in phase with the characters which it represents.

Figure 1:
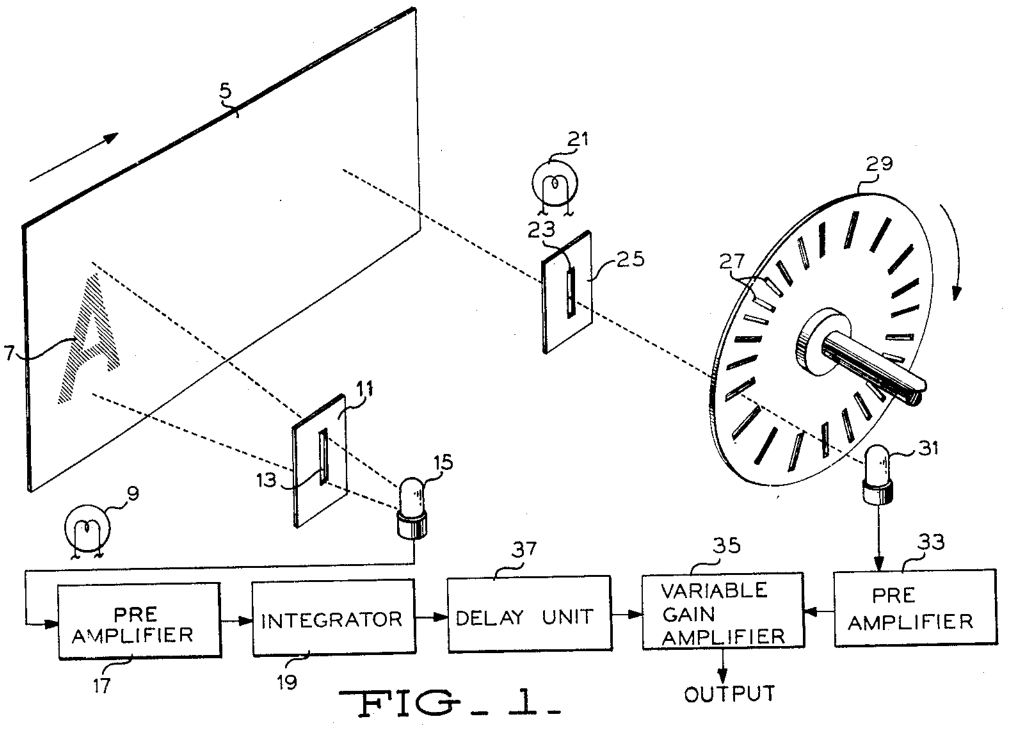
FIG. 1 is a diagrammatic view of one embodiment of the invention as applied to an optical character recognition system.

Referring to FIG. 1 of the drawings, there is shown a first embodiment of the invention for use in connection with an optical character recognition system. As shown, the document 5 carrying printed characters such as 7, is arranged to be transported by means not shown past a first and a second sensing station, separated by a suitable distance in accordance with the construction of the parts. Since the document is presumed to travel with a relatively constant speed, it will be obvious that a predetermined time interval elapses between the passage of a character by the first or advance sensing station, and the second or principal sensing station. The apparatus at the first sensing station includes a light source 9, and a plate 11 carrying a suitable vertical slit 13, arranged in a suitable optical system with lenses not shown, arranged to focus the light reflected from a document through a slit 13 to a first photosensitive device 15. The apparatus is arranged so that the entire scanning zone of the characters passing the first sensing station is covered by the optical system, so that the signals supplied to the photocell 15 will depend upon the relative value of density of the printed characters as they pass the location. The signals supplied from the photosensitive element 15 are passed through a suitable preamplifier 17 to an integrator 19, this integrator having a time constant which determines the interval on the card which will have essentially uniform gain. Assuming that the printing in each filed is essentially uniform, the integrating intervals should be at least as long as the smallest field, say for example, the width of a single character. The signal at the output of integrator 19 is therefore a slowly varying signal which represents the density of the characters passing the first or advance sensing station, and may be therefore used as a control to establish the amount of gain required in the amplifiers associated with the second or principal sensing station.

At the principal scanning station, the document is illuminated by a suitable source 21, and is scanned by the combination of a vertical slit 23 in plate 25, which, in cooperation with a plurality of radial slits 27 in the rotating scanning disc 29, will cause a plurality of successive vertical scans across the document to be supplied to the photosensitive device 31. The scanning signals for photosensitive device 31 are amplified in a suitable preamplifier 33 and are then supplied to the input of a variable gain amplifier 35, the output of which is supplied to suitable character recognition circuits, not shown since they form no part of the present invention. The gain of the variable gain amplifier 35 is controlled by the output of integrator 19, supplied through a suitable delay unit 37, details of which are not shown, but which may be for example, a distributed constant type of delay line. The parameters of this unit are adjusted so that the delay occurring in the transmission of the signal from the output of integrator 19 to the control of the variable gain amplifier 35 is delayed by a time interval substantially equal to the time required for a character on the document to travel between the first and the second sensing stations. Accordingly, it will be apparent that the scanning of a character at the advance or auxiliary sensing station will provide an output signal indicative of the density of the character, which signal is delayed by a time interval sufficient to allow the character to move to the second or principal scanning station, and is then applied to the variable gain amplifier so that the gain is adjusted to provide relatively constant output signals from the variable gain amplifier in response to the scanning of the document at the principal scanning station.

Figure 3:
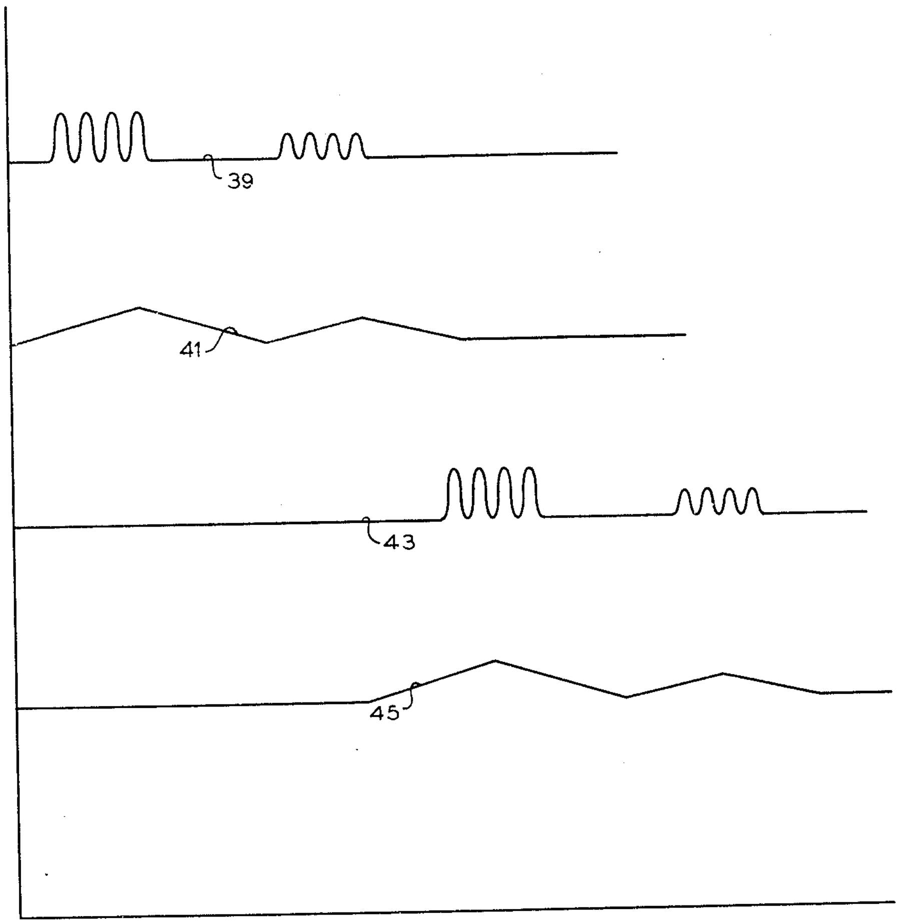
FIG. 3 is a diagrammatic view of the waveforms which might be produced at various points in the arrangements shown in FIGS. 1 and 2.

This action is illustrated in FIG. 3 of the drawings, where the topmost graph 39 indicates the signals picked up at the advance scanning station, the signal at the left hand indicating a relatively heavy ink density, and the signal at the right indicating a relatively light density of the respective characters. The second curve 41 on the drawing is illustrative of the output of the integrator 19, and it can be seen that this output has a relatively higher value for the heavy ink signal than that for the light ink signal. The third curve 43 on the graph is representative of the envelope of the scanning signals obtained at the principal scanning station, and may be considered as the input to the variable gain amplifier 35. It will be seen that the heavy density signal produces a greater signal swing than the light density signal as to be expected. The lowermost curve 45 on the graph is indicative of the amplitude of the control voltage supplied to the variable gain amplifier 35 through the delay unit 37, and it is apparent that this signal is delayed by a time substantially equivalent to the travel time of the character between the two scanning stations.

This control signal is arranged to govern the variable gain amplifier in such manner that higher magnitudes of the control signal will decrease the gain of the variable gain amplifier whereas lower values of the control voltage will increase the gain of the variable gain amplifier, so that the output thereof remains relatively constant despite the variations in the density of the characters being scanned at the principal scanning station. Obviously, other types of output control devices can be governed by the control signal, such as, for example, variable level clipping circuits.

Figure 2:
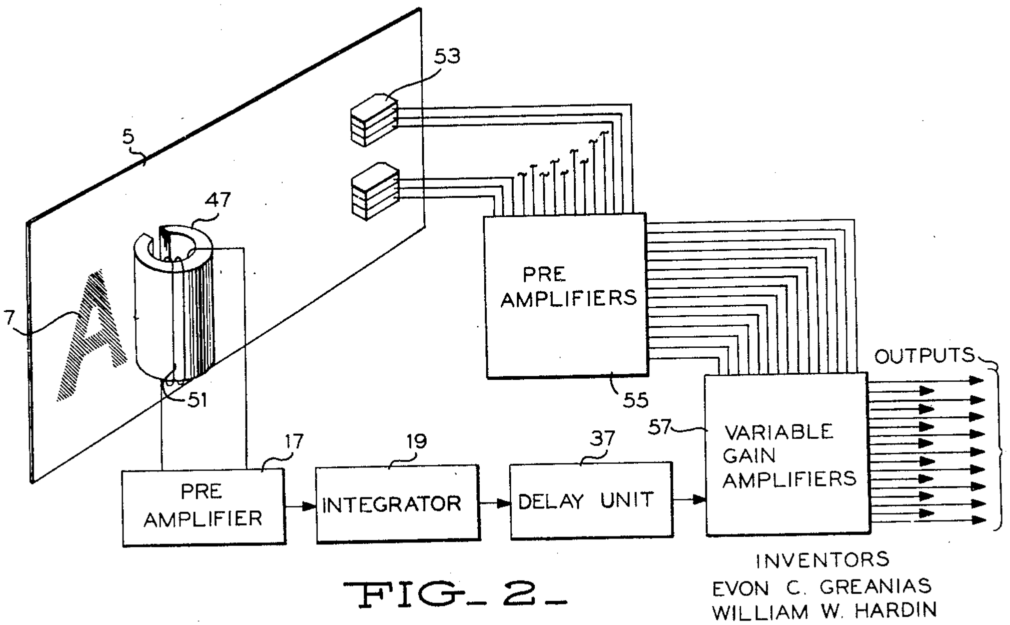
FIG. 2 is a diagrammatic view of a second embodiment of the invention as applied to a magnetic character recognition system.

FIG. 2 of the drawings illustrates the second embodiment of the invention in connection with a magnetic character sensing arrangement. The characters 7 in this instance are formed of material having a relatively higher permeability than the docment 5 which bears the characters so that the character outline is defined by a magnetizable region. These characters are pre-magnetized by passing them by a magnetizing head which is preferably energized by high frequency alternating current, in the manner well know in the magnetic character recognition art. The apparatus at the advance or auxiliary sensing station includes a reading head comprising a core 47 with a winding 51 mounted thereon, the core having a single long non-magnetic gap therein which is of sufficent length to extend over the entire registration zone in which the characters are presented to the reading station. As the magnetized characters pass by the gap in core 47, voltages are induced in an output winding 51 associated with the core and are supplied through a preamplifier 17, an integrator 19 and a delay unit 37 similar to the ones previously described in connection with FIG. 1.

At the principal sensing station, the characters are read by means of a plurality of reading heads 53 arranged in parallel fashion so that a plurality of simultaneous horizontal scans are made through the character. The outputs from these parallel magnetic reading heads are supplied to a corresponding plurality of preamplifiers, indicated generally by the labeled rectangle 55, and are supplied therefrom through a corresponding plurality of variable gain amplifiers 57, the gain of which is controlled by the output on delay unit 37.

The operation of the arrangement shown in FIG. 2 is substantially identical with that described previously in connection with FIG. 1, the advance sensing station providing a voltage which is integrated over a predetermined time interval, and then supplied through a delay unit which delays the control signal by an amount of time substantially equal to that required for the characters to travel from the first to the second sensing station, so that the gain of the variable gain amplifiers 57 is set at the proper value when the characters are passing by the second or principal sensing station.

From the foregoing, it can be seen that the present invention provides an arrangement which provides proper compensation for variations in the density of the characters which are scanned in a character recognition system, so that relatively constant output signals may be obtained for subsequent character analysis.

While there have been shown and described and pointed out the fundamental novel features of the invention as applied to a preferred embodiment, it will be understood that various omissions and substitutions and changes in the form and details of the device illustrated and in its operation may be made by those skilled in the art, without departing from the spirit of the invention. It is the intention, therefore, to be limited only as indicated by the scope of the following claims.

What is claimed is:

1. In a character recognition system in which character-bearing documents are transported past a principal scanning means to supply scanning data signals for subsequent character analysis, an automatic output control system, comprising, in combination, an auxiliary scanning means located in advance of said principal scanning means to scan characters on a character-bearing document a predetermined time before the characters are scanned by said principal scanning means, said auxiliary scanning means scanning an area having one dimension determined by the registration zone of the characters to be recognized, integrating means connected to said auxiliary means to provide an integrated gain control signal in response to the scanning of each character by said auxiliary scanning means, a delay device having an input and an output with said input connected to said integrating means, and a variable gain amplifier connected to said principal scanning means to amplify the scanning data signals, and connected to the output of said delay device to have the gain of said scanning data signals governed by said integrated control signals, said delay device providing a time delay for said integrated control signals substantially equal to said predetermined time interval.

2. In an optical character recognition system including a principal scanning means for optically scanning characters on a character-bearing document transported past said principal scanning means, an automatic output control system comprising an advance scanning means disposed to scan the characters on the documents a predetermined time interval before the characters are scanned by said principal scanning means, said advance scanning means comprising a scanning aperture and a photoresponsive device arranged so that an area of said document having a predetermined width and a length substantially equal to the registration zone of the characters is continuously scanned to produce output signals from said photoresponsive device; integrating means connected to said photoresponsive device to integrate the signals therefrom to provide a gain control signal, a delay device having an input and an output, with the input thereof connected to said integrating means to receive said gain control signal, a variable gain amplifier connected to receive scanning data signals from said principal scanning means, and to provide corresponding output signals with amplitudes governed by a gain control signal supplied to a control input of said variable gain amplifier, the output of said delay device being connected to the control input of said variable gain amplifier, said delay device being effective to provide a signal delay substantially equal to said predetermined time interval.

3. In a magnetic character recognition system including principal scanning means for scanning magnetic characters to provide scanning data signals, an automatic output control system comprising an advance scanning means including a magnetic core having a non-magnetic gap therein dimensioned and arranged to provide a magnetic scanning area commensurate with the registration zone of the characters to be recognized, and an output winding linking said core to have output voltages induced therein by the passage of magnetized characters past said gap; integrating means connected to said output winding to provide an integrated gain control signal in response to said output voltages, and means governed by said integrating means for governing the output of the principal scanning means in response to said integrated gain control signal.

4. In a magnetic character recognition system including principal scanning means for magnetically scanning magnetic characters on a record-bearing document transported past said principal scanning means, an automatic output control system comprising an advance scanning means disposed to scan the characters on the document a predetermined time interval before the characters are scanned by said principal scanning means, said advance scanning means comprising a magnetic core having a non-magnetic gap therein dimensioned and arranged to provide a scanning zone of predetermined length substantially equal to the registration zone of the characters to be recognized, and an output winding linking said core to have output voltages induced therein by the passage of magnetized characters past said gap; integrating means connected to said output winding to integrate the signals therefrom to thereby provide an integrated gain control signal in response to the scanning of said characters by said advance scanning means, a delay device having an input and an output, with the input thereof connected to said integrating means, a variable gain amplifier connected to receive scanning data signals from said principal scanning means, and to provide corresponding output signals with amplitudes governed by a gain control signal supplied to a control input of said variable gain amplifier, the output of said delay device being connected to said control input of the variable gain amplifier, said delay device being effective to provide a signal delay substantially equal to said predetermined time interval.

References Cited in the file of this patent

UNITED STATES PATENTS

| | | |
|---|---|---|
| 2,364,755 | Ritzmann | Dec. 12, 1944 |
| 2,808,518 | Koonz | Oct. 1, 1957 |
| 2,897,481 | Shepard | July 28, 1959 |

FOREIGN PATENTS

| | | |
|---|---|---|
| 759,566 | Great Britain | Oct. 17, 1956 |